June 26, 1962  R. McFARLAND, JR  3,041,036
PLUG VALVE
Filed Dec. 20, 1956  2 Sheets-Sheet 1
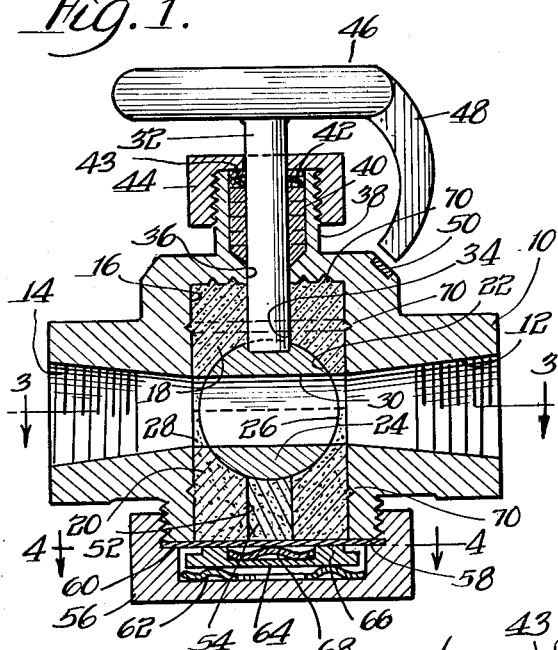
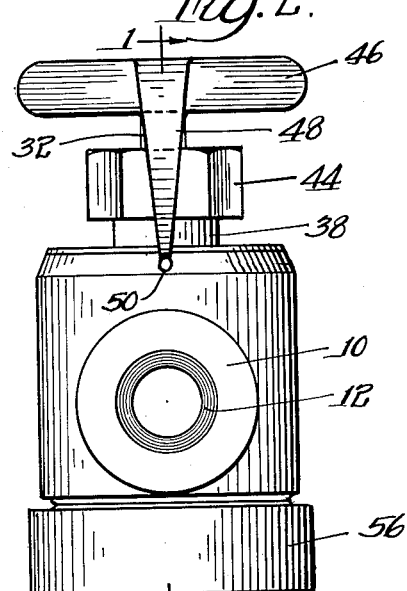
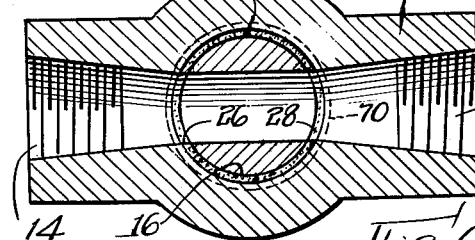
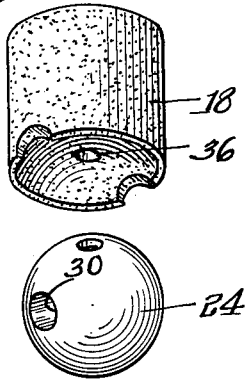
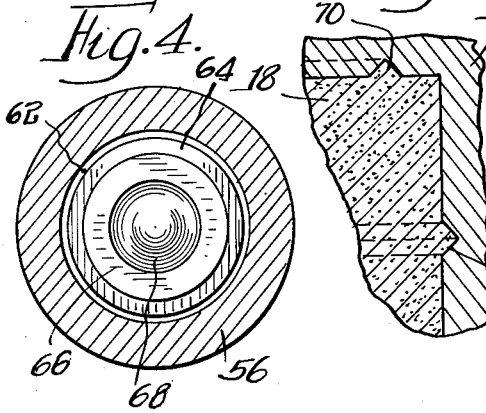
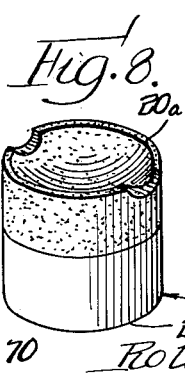
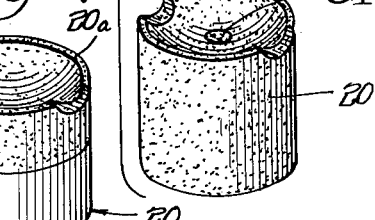
INVENTOR.
Rolland McFarland, Jr.
BY
Olson & Trexler
Attys.

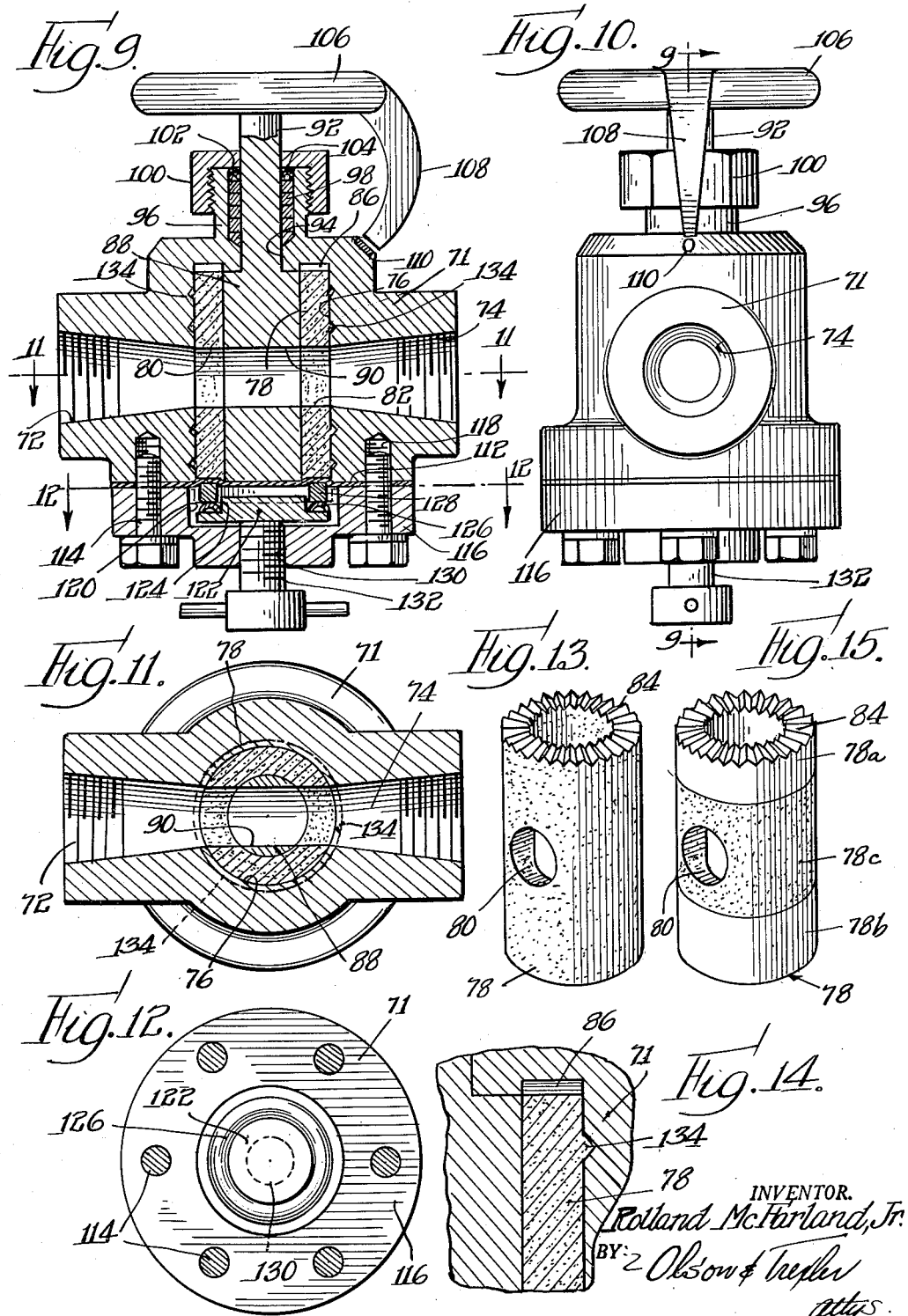

United States Patent Office 3,041,036
Patented June 26, 1962

3,041,036
PLUG VALVE
Rolland McFarland, Jr., Crystal Lake, Ill., assignor to Hills-McCanna Company, Chicago, Ill., a corporation of Illinois
Filed Dec. 20, 1956, Ser. No. 629,538
12 Claims. (Cl. 251—171)

This invention relates to a plug valve of corrosion resistance construction.

Heretofore various valves have been made (wholly or partially) of synthetic resin, to afford resistance against corrosive fluids handled by such valves. Where the entire valve has not been made of synthetic resin, parts such as the body, the valve seat, the valve stem, the packing gland, or like parts particularly exposed to the corrosive fluid have been made of synthetic resin, or else liners of this material have been provided.

Thus, globe valves have been made by a molding process wherein all parts are constructed of synthetic resin. But valve parts made of conventional synthetic resins do not have sufficient strength to withstand the strong mechanical forces generated when a globe valve is closed. Note the multiplication of forces occurring in the operation of a conventional handwheel turning a threaded valve stem. As a result, globe valves made entirely of synthetic resin tend to have an excessive breakage rate when used commercially.

Several types of plug valves made entirely of synthetic resin have also appeared on the market.

One such plug valve includes a conventional cylindrical plug having a smooth fit with a cylindrical valve bore, to define therewith a first valve seal. A secondary seal is formed by O rings of rubber or like resilient material seated in receiving grooves formed in the valve bore at the top and bottom thereof, these parts being suitably held together, as with an external adapter plate and snap ring assembly. A defect of this design is the tendency of most synthetic resins to swell when exposed to different liquids, with resultant locking of the smoothly fitting plug and the valve bore. Practically all synthetic resins are subject to plastic "creep," this creep causing permanent deformation of valve parts made with such resins. This deformation is incompatible with efficient valve operation.

Another defect in plug valves constructed as described in the preceding paragraph is the possibility of deterioration of the O rings, which are depended upon for complete sealing, which then no longer is effected.

Another type of plug valve made entirely of synthetic resin includes a tapered plug having an insert of completely inert synthetic resin which functions as the actual closure member. Such valves depend completely, for effective sealing, on the mating tapered surfaces of the plug and the valve bore. Plastic "creep" will sooner or later occur, causing leakage.

It will be noted that some of the disadvantages of valves made of synthetic resin are due to the relatively low mechanical strength of synthetic resins, their tendency to swell, and the plastic "creep" characteristic of synthetic resins.

The plug valves of the present invention are made (or can be made) entirely of synthetic resin. To avoid the above noted disadvantages, my valves include a number of features disclosed as follows.

The plug member of my valve floats in a cavity, being resiliently supported therein, so that the plug is easily rotated to open and close the valve, the force required for effecting plug rotation being quite small and easily within the strength limits of the synthetic resin from which the valve is constructed.

Another feature of the present invention involves making certain valve parts (for instance, a liner or liners for the cavity receiving the valve plug) of highly inert synthetic resins (such as polyethylene, polytetrafluoroethylene (Teflon), polyvinyl chloride, polymerized chlorinated pentaerythritol, and the like) which in solid form are not resilient and which are always subject to plastic "creep," and forming the surfaces of valve members abutting such liners or other valve parts with grooves adapted to take up said inert synthetic resin upon plastic "creep" of the latter, whereby the change in dimensions upon plastic "creep" is controlled.

Still another feature of the present invention involves providing the inert synthetic resins mentioned in the preceding paragraph in a somewhat spongy form or having numerous small voids therein whereby this synthetic resin is rendered definitely, although only very slightly, resilient, and subjecting the part or parts made of this material to constant compression, whereby effective sealing is maintained even if changes in dimensions occur, as on plastic "creep."

Still another feature of the present invention involves providing a liner or retainer for the valve plug made of said inert, porous, slightly resilient synthetic resin, and constructing said liner or retainer so that the valve plug will be floatingly supported therein, the liner being under constant compression to insure a permanent seal against leakage.

Other and further features of the present invention will become apparent from the following description and appended claims, as illustrated by the accompanying drawings, which show, by way of examples, valves according to the present invention and in which:

FIG. 1 is a cross sectional view, with parts shown in elevation, taken along the line 1—1 of FIG. 2 and showing a valve according to the present invention;

FIG. 2 is a side elevation of the valve of FIG. 1;

FIG. 3 is a cross sectional view taken along the line 3—3 of FIG. 1;

FIG. 4 is a cross sectional view taken along the line 4—4 of FIG. 1;

FIG. 5 is an exploded, perspective view showing the valve plug and plug retainers of the valve of FIG. 1;

FIG. 6 is an enlarged fragmentary cross sectional view similar to FIG. 1 and illustrates grooves provided in the valve body for taking up plastic "creep" from the plug retainer;

FIG. 7 is an enlarged fragmentary view similar to FIG. 1 and illustrates the construction of the upper part of the packing gland of the valve of FIG. 1;

FIG. 8 is a perspective view similar to FIG. 5 and illustrating a valve plug retainer of slightly different construction;

FIG. 9 is a cross sectional view, with parts shown in elevation, taken along the line 9—9 of FIG. 10, and illustrating another valve constructed according to the present invention;

FIG. 10 is a side elevation of the valve of FIG. 9;

FIG. 11 is a cross sectional view taken along the line 11—11 of FIG. 9;

FIG. 12 is a cross sectional view taken along the line 12—12 of FIG. 9;

FIG. 13 is a perspective view of the valve liner or retainer of the valve of FIG. 9;

FIG. 14 is an enlarged fragmentary view similar to FIG. 9 and shows the interlocking between the valve retainer or liner and the valve body of the valve of FIG. 9 together with grooves provided in the valve body for taking up plastic "creep"; and FIG. 15 is a view similar to FIG. 13 and showing a valve liner or retainer of slightly different construction.

The valve of FIGS. 1-7 includes a valve body 10 made of any suitable synthetic resin. This valve body 10 is formed with converging, aligned horizontally extending inlet and outlet ports 12 and 14 which are internally threaded at their outer ends to receive the ends of conduits or pipes for fluids the flow of which is to be controlled. Further, the valve body 10 is formed with a central vertical well 16 intersecting the ports 12 and 14. A cylindrical retainer sleeve made up of mating upper and lower halves 18 and 20 is seated within the well 16, being received therein with a snug fit. This central sleeve is made of porous or spongy polyvinyl chloride, Penton (a polyether of chlorinated pentaerythritol), Teflon (polytetrafluoroethylene), or polyethylene or other like synthetic resin characterized by extreme resistance to corrosion and practically no resilience when fabricated in solid form but appreciable, although limited resilience when fabricated in spongy or porous form, for instance, with numerous small voids forming about 5% of the total volume of the fabricated article.

The two halves 18 and 20 of the above noted retainer sleeve are of identical construction. Specifically, the opposing ends are formed in semi-spherical concave shape, to define jointly a spherical cavity 22 snugly and rotatably receiving a spherical valve member 24 made of Teflon, Penton, polyvinyl chloride (in solid form), ceramic or other highly resistant material. The halves 18 and 20 of the sleeve also jointly define apertures 26 and 28 each of the same size and shape as the inner ends of the ports 12 and 14 and aligned with these ports, to define inward continuations thereof. The spherical valve member 24 is apertured diametrically, as indicated at 30, and this aperture is of the same shape and cross sectional area as the apertures 26 and 28. Thus, on rotation of the valve member 24, the valve is opened (the aperture 30 then being aligned with the apertures 26 and 28) or closed.

To rotate the valve member 24, a valve stem 32 (made of synthetic resin) has its lower end fixed, by any suitable means, to the central upper portion of the valve member 24. The stem 32 is rotatable within a bore 34 in the upper half 18 of the retainer sleeve 18, 20 and within a bore 36 in the valve body 10 aligned with the bore 34. The top of the valve body is formed as an externally threaded stuffing box 38 through which the stem 32 passes. Teflon or like packing 40 is provided within this stuffing box around the stem 32. The packing 40 is held under constant compression by a Belleville spring 42 which is compressed by a retainer gland nut 44 threaded over the stuffing box 38. If desired, an annular washer 43 may be provided between the nut 44 and the spring 42. At its free end, the stem 32 carries a handwheel 46 provided with a depending pointer 48. Suitable indicia 50 are located on the valve body 10 to correlate the position of the pointer 48 with the open and closed positions of the valve.

As disclosed hereinabove, the two sleeve parts 18 and 20 are of identical construction. The reason for this is simply ease of fabrication. The lower part 20 is formed with an aperture 52 matching the aperture 34 in the upper part 18. The aperture 52 is closed by a plug 54 made of porous Teflon or the like and has its upper end face ground into concave shape, to fit the surface of the valve member 24. If desired, the lower sleeve part 20 may be made in one piece instead of with the aperture 52 closed by the plug 54.

The sleeve 18, 20 is held under axial compression by means described as follows. The lower portion of the valve body 10 is threaded externally to receive adjustably a cap 56 having an internal shoulder 58. A gasket disk 60 made of Teflon or like material has its edges clamped between the shoulder 58 and the end of the lower portion of the valve body. An annular Belleville spring 62 is disposed inside the cap 56. A round disk 64 made of synthetic resin rests on the spring 62 and has an upstanding annular flange 66 extending around its periphery into contact with the gasket disk 60. A round Belleville spring 68 rests on the disk 64 inside the flange 66 with its center contacting the gasket disk 60.

The valve body 10 is formed with internal grooves 70, which serve to receive synthetic resin displaced in the retainer 18, 20 due to plastic "creep." These grooves extend both in the bottom surface and the side walls of the well 16 wherein the retainer sleeve 18, 20 is seated.

In the valve of FIGS. 1-7, the retainer sleeve 18, 20 will not swell. Thus, the valve plug 24 will never be locked or frozen but can always be rotated easily. The ends of the retainer parts 18 and 20 constantly bear against the spherical valve plug 24. The end surfaces of the retainer parts are not deformed by plastic "creep" of the synthetic resin making up the retainer sleeve 18, 20. Instead, material displaced as a result of "creep" will be received in the grooves 70, which contributes to efficient sealing and to holding the retainer sleeve 18, 20 in position while eliminating distortion of the semi-spherical surfaces defining the cavity wherein the valve plug 24 is floatingly received.

The packing 40 effectively prevents leakage along the valve stem 32. The gasket disk 60 seals the valve against leakage at the bottom.

The compressed Belleville springs 62 and 68 (or other resilient members, such as pads or disks of Neoprene sponge) keep the retainer parts 18 and 20 under constant axial thrust, thus preventing leakage along the mating surfaces of these retainer parts. Due to the resiliency of these retainer parts, the concave end surfaces thereof are yieldingly forced against the valve plug 24, to support the latter and to seal the valve against leakage around the valve plug 24. However, the pressure against the valve plug 24 is not sufficient to hold the valve plug against rotation or to place any great stress on the valve plug 24, the stem 32 or the handwheel 46.

As required, the cap 56 may be tightened to maintain the axial compression of the retainer sleeve 18, 20.

The above construction thus yields an effective valve which will function satisfactorily for a long time. In particular, the functioning of the valve will not be interfered with by effects such as swelling or plastic "creep." Further, no excessively great mechanical forces will be generated in the operation of my valve.

The valve of FIGS. 1-7 can be fabricated with great precision from appropriate materials of construction. The valve body 10 can be cast or molded, any suitable synthetic resin or metal being used. The nut 44 and cap 56 are easily made of synthetic resin or metal. The retainer sleeve parts 18 and 20 can be made by a coining process in which a master ball is used as a coining member to form accurately the concave end surfaces thereof, the apertures 26, 28, 34 and 52 being suitably machined after completion of the coining operation. The master ball used for coining can be used as a pattern for the valve plug 24, whereby accurate fit is insured as between the valve plug 24 and the concave end surfaces of the retainer parts 18, 20 which jointly define the spherical cavity wherein the valve plug 24 is nested.

The parts of the valve of FIGS. 1-7 are easily assembled. First, the upper retainer part 18 is seated in the well 16. Next, the valve plug 24 is inserted (with its recess for the stem 32 facing upwardly), followed by the lower retainer part 20. The gasket disk 60 is then placed over the open lower end of the well 16, and the spring 68, the disk 64 and the spring 62 are placed in their proper positions. The cap 56 is then screwed onto the end of the valve body 10, to the depth required to bring about the desired axial compression on the retainer sleeve 18, 20. Next, the valve stem 32 is passed through the bores 36 and 34, to fit the end of the stem into the recess in the valve plug 24. This end of the valve stem 32 and the recess in the valve plug may both be of square cross sectional shape, so that the valve plug 24 will rotate with the stem 32. Then the packing 40 is inserted in the stuffing box 38, and the gland nut 44 is screwed over the stuffing box to compress the packing as may be desired. Finally, the handwheel 46 is affixed to the free end of the valve stem 32.

Disassemblage is done in reverse order of steps.

FIG. 8 shows a valve construction differing slightly from that of FIGS. 1-7. Specifically, the retainer sleeve part 20 is made up of two sections 20a and 20b. The part 20a is made of porous Teflon or the like, as the parts 18 and 20 in the valve of FIGS. 1-7, while the part 20b is made of solid Teflon or the like. Similarly, the upper part of the sleeve part 18 is made of solid Teflon and the lower part of porous Teflon. Fabrication of the retainer sleeve 18, 20 is facilitated somewhat by the construction shown in FIG. 8, since only the parts made of porous Teflon are coined. A valve constructed as shown in FIG. 8 functions similarly to the valve of FIGS. 1-7.

FIGS. 9-14 show another valve according to the present invention, which includes a valve body 71 formed with opposed aligned inlet and outlet ports 72 and 74. The ends of these ports are internally threaded to receive the ends of conduits or pipes for fluids the flow of which is to be controlled. A well 76 intersects the ports 72 and 74 and receives snugly a tubular retainer or sleeve 78 formed with apertures 80 and 82 aligned with and of the same cross sectional area and shape as the ports 72 and 74. The upper end of the sleeve 78 is ribbed transversely, as indicated at 84, and the ribs 84 mesh with complementary grooves 86 formed at the upper end of the well 76. The sleeve 78 is fabricated of porous Teflon or the like, similarly to the retainer sleeve 18, 20 of the valve of FIGS. 1-7.

A cylindrical valve plug 88 is rotatably received in the sleeve 78. The plug 88 is formed with a transverse bore 90 aligned with and of the same cross sectional shape and area as the apertures 80 and 82 in the sleeve 78. A valve stem 92 integral with the valve plug 88 extends upwardly through a bore 94 in the valve body 71 and through an externally threaded stuffing box 96 integral with the valve body 71. Teflon packing 98 surrounds the valve stem 92 in the stuffing box 96, being kept under compression by a retainer gland nut 100, an annular Belleville spring 102 resting on the packing 98 and a washer 104 disposed between the spring 102 and the nut 100. The free end of the valve stem 92 is provided with a handwheel 106 having a depending pointer arm 108. Suitable indicia 110 on the valve body 70 are provided whereby the position of the pointer arm 108 will indicate the open or closed position of the valve.

The bottom end of the valve of FIGS. 9-14 is sealed by a Teflon diaphragm 112 peripherally apertured to admit therethrough bolts 114 which hold a cover 116 on the bottom of the valve body 70, the latter being suitably tapped to receive these bolts, as indicated at 118. Thus, the periphery of the diaphragm gasket disk 112 is clamped between the valve body 70 and the cover 116. The latter is centrally recessed on its upper face, as shown at 120, to receive a disk 122 having a peripheral recess 124 aligned with the lower end of the sleeve 78. An annular Belleville spring 126 is seated in the recess 124. A thrust ring 128 rests on the spring 126. The cover 116 is formed with a central threaded aperture 130 receiving an adjustable screw 132.

The well 76 is formed with circumferential grooves 134 which serve to receive resin displaced within the sleeve 78 due to plastic "creep."

The sleeve 78 is held under constant resilient compression by the spring 126 through the thrust ring 128 and the diaphragm 112. The pressure exerted by the spring 126 is regulated by adjustment of the screw 132.

The valve of FIGS. 9-14 is sealed against upward fluid leakage by the packing 98 in the stuffing box 96 and against downward leakage by the diaphragm 112. The very slight but definite resiliency of the axially compressed sleeve 78 causes the latter to exert resilient pressure on the walls of the well 76 and the valve plug 88, to prevent leakage along the sleeve of the plug. The resinous material displaced into the grooves 134 also acts to prevent such leakage.

If desired, the sleeve 78 can be made of solid rather than porous Teflon or the like. In such case, the sealing action of the resilient sleeve against the wall of the well 76 and the plug 88 is not obtained.

The valve of FIGS. 9-14 can be operated easily. The valve plug 88 floats within a space defined by the sleeve 78 and the diaphragm 112. Neither of these enclosing structures is subject to swelling and any plastic "creep" of the sleeve 78 is diverted into the grooves 134, as in the valve of FIGS. 1-7. There is no need to rely solely, for complete sealing, on closely fitting opposed relatively movable surfaces, which sometimes tend to stick or to freeze together.

FIG. 15 shows a slightly modified form of the sleeve 78 wherein the sleeve is made up of upper and lower portions 78a and 78b fabricated of solid Teflon or the like and a central portion 78c fabricated of porous Teflon or the like. This sleeve functions similarly to that of FIGS. 9-14. If desired, the portions 78a and 78b may be made of porous Teflon or the like and the central portion 78c of solid Teflon or the like. In that case the sleeve 78 also functions similarly to that of FIGS. 9-14.

The valve body 71 may be fabricated from any suitable synthetic resin or metal. The valve plug 88 may be constructed of any suitable synthetic resin, metal or ceramic.

It should be understood that when the retainer sleeve 18, 20 of FIGS. 1-8 or the retainer sleeve 78 of FIGS. 9-15 is constructed of other materials than porous Teflon or the like, the construction of the valves offers many advantages over conventional valves, particularly with respect to effective sealing at the top and bottom of the valve and with respect to easy operation of the valve due to the floating suspension of the plug valve members 24 and 88 which eliminates the need for any multiplication of mechanical forces for valve operation. Such multiplication of mechanical forces leads to the generation of localized stress conditions which are conducive to valve breakage, particularly in the case of valves fabricated wholly or in part from synthetic resins. The latter materials are not characterized by a mechanical strength sufficient to withstand mechanical forces of the magnitude generated by such multiplication of mechanical forces.

Many details may be varied without departing from the principles of this invention and it is therefore not my purpose to limit the patent granted on this invention otherwise then necessitated by the scope of the appended claims.

The invention is claimed as follows:

1. A valve comprising a valve body having lateral inlet and outlet ports and a central well extending transversely of said ports and open at the lower face of said valve body, a flexible diaphragm closing the open end of said well, a hollow retainer seated in said well in contact with said diaphragm, said retainer being constructed of a synthetic resin subject to plastic creep, said valve body being formed with internal grooves opening into said well to receive resinous material displaced as a result of plastic creep, a plug valve member rotatably seated in said retainer and apertured transversely to provide communication between said ports in a selected position of rotation of said plug valve member, and a valve stem attached to the upper side of said valve plug, the upper portion of said valve body being formed with a bore rotatably receiving the valve stem.

2. A valve comprising a valve body having lateral inlet and outlet ports and a central well extending transversely of said ports and open at the lower face of said valve body, a diaphragm closing the open end of said well, a hollow retainer seated in said well in contact with said diaphragm, said retainer being made up of upper and lower sections having concave opposed end surfaces together defining a spherical cavity and apertures aligned with said ports, said retainer being made of a porous synthetic resin, said resin being relatively rigid when provided in solid form and resilient when provided in porous form, a spherical plug valve member rotatably seated in said retainer and apertured transversely to provide communication between said apertures in a selected position of rotation of said plug valve member, a valve stem attached to the upper side of said valve plug member, and means at the lower face of said valve body for exerting a constant axial thrust through said diaphragm on the said retainer, the upper portion of said valve body being formed with a bore rotatably receiving said valve stem, and the interior of said body being formed with grooves opening into said well to receive synthetic resin displaced as a result of plastic creep.

3. A valve according to claim 2 in which said means for exerting a constant axial thrust on said retainer comprises a hollow cap adjustably attached to the lower face of said valve body and a spring disposed within said hollow cap.

4. A valve according to claim 2 in which said means for exerting a constant axial thrust on said retainer comprises a hollow cap adjustably attached to the lower face of said valve body, an annular spring on the inside of said cap, a disk resting on said spring, and a second spring disposed between said disk and said diaphragm.

5. A valve according to claim 2 further comprising packing around said valve stem and means for keeping said packing under compression, said grooves on the interior of said valve body extending both in the side walls of said well and in the bottom of said well.

6. A valve according to claim 2 in which the upper and lower end portions of said retainer parts are made of solid synthetic resin.

7. A valve comprising a valve body having lateral inlet and outlet ports and a central well extending transversely of said ports and open at the lower face of said valve body, a diaphragm closing the open end of said well, a hollow cylindrical retainer seated in said well in contact with said diaphragm, said retainer being formed with apertures aligned with said ports and being made of a porous synthetic resin, said resin being characterized by resiliency when provided in porous form and by relative rigidity when provided in solid form, a cylindrical plug valve member rotatably seated in said retainer and apertured transversely to provide communication between said apertures in a selected position of rotation of said plug valve member, a valve stem attached to the upper side of said valve plug, and means at the lower face of said valve body for exerting a constant axial thrust through said diaphragm on the said retainer, the upper part of said valve body being formed with a bore rotatably receiving said valve stem and the interior of said valve body being formed with grooves opening into said well to receive synthetic resin displaced as a result of plastic creep.

8. A valve according to claim 7 in which said means for exerting a constant axial thrust on said retainer comprises a hollow cap affixable to the lower face of said valve body and resilient means disposed within said cap and adjustably abutting said retainer through said diaphragm.

9. A valve according to claim 7 in which said means for exerting a constant axial thrust on said retainer comprises a hollow cap affixable to the lower side of said valve body, a disk resting on the inside of said cap, an annular spring disposed on said disk, a thrust ring disposed between said annular spring and said diaphragm and screw means extending threadably through said cap to engage said disc for adjusting the thrust imposed upon said retainer.

10. A valve according to claim 7 wherein the upper end of said retainer is formed with radial ribs and the upper end of said well is formed with radial grooves receiving said ribs.

11. A valve according to claim 7 in which the upper and lower portions of said retainer are formed of said synthetic resin provided in solid form and in which the mid-portion of said retainer is formed of said synthetic resin provided in porous form.

12. A valve comprising a valve body having lateral inlet and outlet ports and a central well extending transversely of said ports and open at the lower face of said valve body, said valve body being formed with internal grooves opening into said well, a flexible diaphragm closing the open end of said well, a hollow retainer seated in said well in contact with said diaphragm, said retainer being formed of synthetic resin which is relatively rigid when provided in solid form, said resin being provided in porous form and thereby made resilient, said grooves receiving resinous material displaced from said retainer as a result of plastic creep, a plug valve member rotatably seated in said retainer and apertured transversely to provide communication between said ports in a selected position of rotation of said plug valve member, a valve stem attached to the upper side of said plug valve member, the upper portion of said valve body being formed with a bore rotatably receiving said valve stem, and means at the lower face of said valve body for exerting constant axial thrust through said diaphragm only on said retainer.

References Cited in the file of this patent

UNITED STATES PATENTS

| | | |
|---|---|---|
| 325,825 | Drew | Sept. 8, 1885 |
| 1,683,555 | Key | Sept. 4, 1928 |
| 2,063,699 | Schellin | Dec. 8, 1936 |
| 2,256,483 | Johnston | Sept. 23, 1941 |
| 2,295,109 | Hamilton | Sept. 8, 1942 |
| 2,391,278 | Stark | Dec. 18, 1945 |
| 2,424,210 | Sutton | July 15, 1947 |
| 2,561,028 | Looney | July 17, 1951 |
| 2,729,420 | Schenck | Jan. 3, 1956 |
| 2,766,961 | Meusy | Oct. 16, 1956 |
| 2,776,104 | Sinkler | Jan. 1, 1957 |
| 2,792,018 | Turak | May 14, 1957 |
| 2,861,773 | Clade | Nov. 25, 1958 |
| 2,864,580 | Lemoine | Dec. 16, 1958 |

FOREIGN PATENTS

| | | |
|---|---|---|
| 354,401 | Great Britain | Aug. 13, 1931 |
| 480,910 | Italy | May 16, 1953 |